Sept. 12, 1950     T. J. LEHANE ET AL     2,522,286
TEMPERATURE CONTROL APPARATUS
Filed June 15, 1946
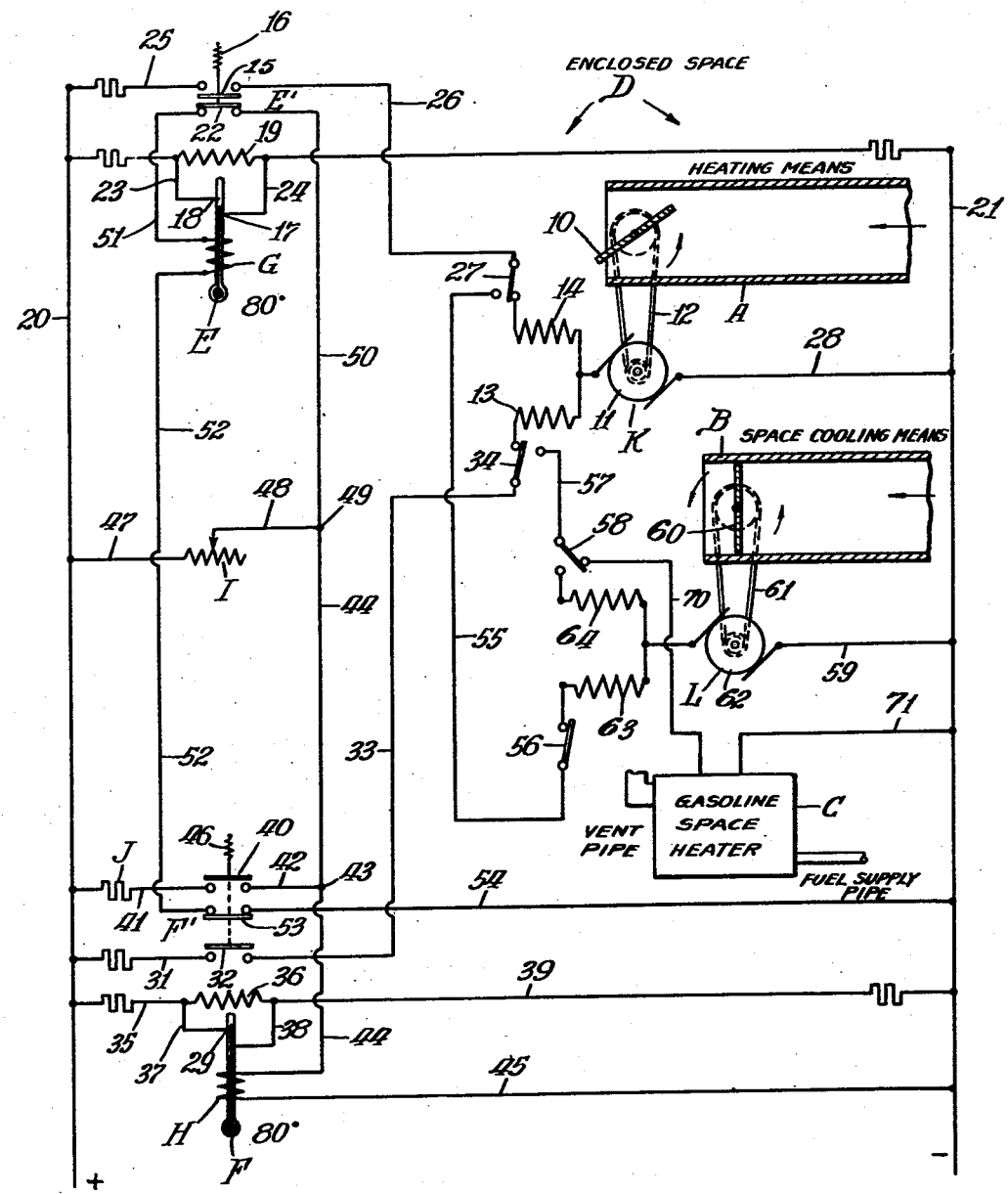
INVENTORS.
Timothy J. Lehane
BY Everett H. Burgess
Harvey M. Gillespie Atty Patented Sept. 12, 1950

2,522,286

UNITED STATES PATENT OFFICE 2,522,286

TEMPERATURE CONTROL APPARATUS

Timothy J. Lehane and Everett H. Burgess, Chicago, Ill., assignors, by mesne assignments, to Vapor Heating Corporation, a corporation of Delaware Application June 15, 1946, Serial No. 676,900

16 Claims. (Cl. 257—3)

The invention relates to certain new and useful improvements in a temperature control apparatus.

A principal object of the invention is to provide a simplified and efficient apparatus which may be utilized to control the temperature of an enclosed space, to wit, the heating and the cooling thereof, so as to maintain the space at substantially a predetermined temperature or within any desired temperature band having maximum and minimum temperatures.

A further object is to provide an improved temperature control apparatus in which the control functions may be transferred from one temperature altering means to another (either heating or cooling) so that the selected temperature altering means may be operated alternatively or in sequence.

Another object is to provide a temperature control apparatus including a plurality of temperature responsive elements which may be set to function at the same temperature to permit operations of the apparatus for increasing or decreasing the temperature of the enclosed space, but which are so connected that the temperature responsive element which gains control of the apparatus will retain that control until the temperature of the enclosed space warrants a transfer of the control functions to an opposing temperature responsive element.

Another object of the invention is to provide in a temperature control system including temperature responsive elements adapted to function at the same temperature settings for increasing or decreasing the heating or the cooling of an enclosed space, certain novel and improved connections between opposing temperature responsive elements, whereby the functioning of one element accelerates its own reversal, so as to produce a cycling action, and also accelerates a reversal in the operation of an opposing temperature responsive element so that the control of the apparatus will not be lost to the opposing temperature responsive element until the temperature of the enclosed space demands such transfer.

According to the principles of the invention, a temperature altering means, which means may include one or more devices designated A, B or C herein for heating or cooling an enclosed space D, is electrically controlled by means of a pair of thermostats E and F and their associated relays E' and F'. The thermostat E is provided with an auxiliary electric heater G, whereby additional heat may be added to the thermostat to adjust its functional setting. The thermostat F is provided with a similar electrical heater H. The electrical heaters of both thermostats are normally supplied with equal amounts of heating current through a variable resistor I and are otherwise constructed and arranged within the enclosed space so that, in the absence of other influences, they will have the same functional setting. However, in view of the fact that thermostat E controls the operations so as to prevent a further rise in temperature within space D and thermostat F controls operations to prevent further decline of the temperature within the space, it is desirable to avoid simultaneous operations of both thermostats. Consequently, automatic adjustments of the thermostats are effected to alter the relative temperatures of the auxiliary heaters G and H. This adjustment is effected in such manner as to accelerate a reversal of the thermostat which happens to be in control, and simultaneously reverses the operation of the opposing thermostat so as to retard its movement in a direction to take control.

For a specific illustration of the manner in which the adjustments are made, let it be assumed that both thermostats are set to function at a space temperature of 70° F. plus 10° of added heat from electrical current flowing through variable resistor I. Therefore, in order to avoid simultaneous control operations of both thermostats the heating current (equivalent to 10° of heat) is shifted back and forth from one thermostat to the other. For example, when the mercury column of thermostat E engages its upper contact, the auxiliary heater G is deenergized and the current is transferred to heater H of thermostat F. There is also an additional amount of heating current supplied through resistor J to heater F only when its mercury column is below its upper contact so as to accelerate its return to its circuit closing position. Consequently, with a space temperature of slightly below 70° F., the mercury column of thermostat E will stand slightly below its upper contact and the mercury column of thermostat F, by virtue of the heating current previously supplied through resistor J to heater H, will stand slightly above its upper contact. The positions just mentioned (thermostat E open and thermostat F closed) are the normal positions assumed when the temperature altering means stands in a previously adjusted position. However, when the thermostat E functions (closing of its contacts) the heating current is transferred momentarily from its heater G to the heater H of the opposing thermostat F. This transfer of heat moves the mercury column of thermostat F somewhat higher and therefore prevents the control functioning of thermostat F (the opening of its contacts) during the cooling of thermostat E. As soon as thermostat E cools sufficiently to open its contacts the 10° of heating current from resistor I is removed from thermostat F and re-applied to thermostat E. In this way, the thermostats are alternately heated and cooled so that when the space temperature stands at 70° the mercury column of thermostat F will stand slightly above its upper contact with a tendency to move below the said contact, and the mercury column of thermostat E will stand below its upper contact with a tendency to move into contact.

Referring now to the accompanying drawing wherein one form of control apparatus is illustrated: The temperature altering means A, B and C are shown diagrammatically. The means A is indicated as a means adapted to control the delivery of heated air from any source into the enclosed space D. However, any form of heat supplying means may be utilized where the effectiveness of the heat transfer may be controlled by controlling the operation of a motorized valve. The means C is intended as an alternative form of heater, for example the general type of gasoline heaters used in the cabins of airplanes. The means C is intended to represent any known means of cooling an enclosed space, which means may be made effective and ineffective by the operation of a motorized mechanism.

The means A includes a valve 10 adapted to move to different positions of adjustment by a reversible motor K. The motor is of the well known reversible type in which limit switches, opened and closed by the movement of the motor, determine the extreme forward and reverse movements of the motor. For example, when the valve 10 is in its fully closed position, the limit switch 34 of motor K is in a position to connect wire 33 with field 13 and the limit switch 27 is in a position to connect wires 26 and 55. The field winding 13, when energized, imparts forward movements to the motor armature 11. Consequently, with the limit switches 27 and 34 in the above described positions, the closing of contact 32 of relay F'' will energize said field winding 13 to impart a forward movement to the armature of motor K. The said armature is connected to the valve 10 by means of any suitable speed reduction drive mechanism 12. Consequently the forward movement of the armature imparts an opening movement to the valve 10.

As soon as said armature 11 is moved an appreciable distance out of its "valve closed position" the limit switch 27 is moved to the position shown in the drawing. When the limit switches 27 and 34 of motor K are in the positions illustrated in the drawings, either field 13 or 14 may be energized. Consequently, the motor may be operated in either forward or reverse directions. Assuming that the motor continues its forward operation for the full extent allowed, the switch 34 will be operated by the final movement of the motor to open the electrical connection between wire 33 and field winding 13. Consequently the next energization of the motor will have to be through the reversing field 14. The energization of a field winding 14 reverses the movement of the motor and valve and thereby decreases the supply of heat to the space D. The operation of the motor K is controlled by a pair of relays E', F'' which are in turn controlled by thermostats E and F. The relay E' for energizing the motor K to operate it in a direction to close the valve 10 includes a normally closed contact 15. That is to say, the contact 15 is closed by a spring 16 when the mercury column of thermostat E is in position to close its contacts 17, 18. The said relay designated E' is operated by a solenoid 19 connected across the positive and negative lines 20, 21. When the mercury column of thermostat E stands between the contacts as indicated in the drawing, the solenoid 19 is energized and thereby opens the motor energizing circuit at the relay contact 15. This operation of the relay also closes its contact 22 so as to energize the auxiliary heater G. As soon as the temperature at the thermostat E rises sufficiently to cause its mercury column to engage the upper contact 18, the current is directed around the solenoid through the wires 23, 24 so as to deenergize the relay E', whereupon the contact 15 is moved to its closed position and the contact 22 is opened. The closing of contact 15 of relay E' establishes a motor energizing circuit leading from positive line 20 through wire 25, closed contact 15, wire 26, limit switch 27 of motor K, thence through field winding 14, armature 11 and wire 28 to the negative line 21. This operation of motor K continues to impart a closing movement to heat valve 10 until the thermostat E cools sufficiently to re-open the circuit at its contact 18 and thereby re-energize the relay solenoid 19 to open the motor circuit at relay contact 15. This opening and closing of contacts 17, 18 will be repeated at frequent intervals until the heat valve 10 has reached a position to satisfactorily reduce the heat supplied to this space. If the temperature of the enclosed space cools sufficiently to open the circuit at contact 29 of thermostat F, a solenoid 36 is energized to actuate relay F'' and thereby close an energizing circuit through the field winding 13 of motor K. This energizing circuit leads from positive line 20 through wire 31, closed contact 32 of relay F'', wire 33, limit switch 34, field winding 13 of motor K, and thence through the motor armature 11 and wire 28 to the negative line 21. This movement of motor K imparts an opening movement to the heat valve 10 to increase the supply of heat to the enclosed space D. This valve opening movement of motor K will continue until the temperature at thermostat F is raised sufficiently to move its mercury column into engagement with contact 29, and thereby deenergize relay F'' so as to open the said motor circuit. This deenergization is accomplished by directing the current in wire 35 around relay solenoid 36 and through wires 37, contact 29 and wires 38 and 39 to the negative line. It is desirable to accelerate the closing of the thermostat contact 29, at least momentarily, so as to modulate the position of heat valve 10 in a step by step operation toward its fully open position. This accelerated closing of said contact 29 is obtained by the closing of contact 40 of relay F''. This closes a circuit which supplies heating current to the auxiliary heater H of thermostat F. This circuit leads from positive line 20 through resistor J, wire 41, closed contact 40 of relay F'' and wire 42 to terminal 43, and thence through wire 44, heater H and wire 45 to the negative line 21.

The resistor J may be of any suitable value to assist in accelerating the closing of the thermostat circuit at its contact 29. The reclosing of the thermostat circuit at contact 29 again releases the relay F'', whereby spring 46 functions to open the said motor circuit at relay contact 32 to stop the valve opening movement of motor K. The last mentioned movement of relay F' also opens the relay contact 40 and consequently opens the last mentioned heating circuit through auxiliary heater H so as to permit the thermostat to cool. This alternate heating and cooling of the thermostat results in recurrent opening and closing of its relay actuating circuit at contact 29 and therefore results in imparting step by step movements to the motor K and heat valve 10 until the temperature of the space is raised sufficiently to maintain the mercury column in a position above contact 29.

While the heating current supplied to auxiliary heater H through resistor J may be sufficient to sustain the cycling operation just described for thermostat F, the thermostats E and F are adjusted relative to each other so as to avoid conflict in their control functions by shifting a quantity of auxiliary heater current from one thermostat to the other. It will be seen that heating current is supplied to both auxiliary heaters G and H through the variable resistor I. The circuit leads from positive line 20 through wire 47, through variable resistor I and wire 48 to terminal 49. From this point half of the current flows through wire 50, closed contact 22 of relay E, wire 51, auxiliary heater G, wire 52, closed contact 53 of relay F', and thence through wire 54 to the negative line 21. The other half of the current flows from terminal 49 through wire 44 to auxiliary heater H and wire 45 to the negative line 21.

The resistor I may be adjusted to supply any desired amount of heating current and thereby simultaneously raise or lower the functional settings of both thermostats E and F. For the purpose of the present illustration, the adjustment of resistor I has a value of 20° F., one half of which goes to auxiliary heater G, and one half of which goes to auxiliary heater H. It will be observed, therefore, that when thermostat E makes contact to impart a valve closing movement to motor K, the circuit for auxiliary heater G is opened so as to permit cooling of thermostat L and this heating current is transferred to auxiliary heater H. Consequently, the mercury column of thermostat E is caused to recede downwardly from its contact 18 so as to interrupt the motor circuit and thereby stop the closing movement of valve 10. The transfer of the said heating current to the auxiliary heater H of thermostat F moves its mercury column upwardly from its contact 29 so as to delay the cooling of the thermostat and consequently retard the opening of its control circuit at thermostat contact 29. As soon as the thermostat E cools sufficiently to again open its circuit at its contact 18, the heating current is returned to auxiliary heater G, thereby heating the thermostat E and proportionately cooling thermostat F. This alternate heating and cooling of thermostats E and F will continue until the space D has cooled sufficiently to permit the mercury column of thermostat F to move to a position to open its circuit at its contact 29. When this occurs, a similar transfer of heat from one thermostat to the other is effected by opening and closing of the heater circuit for auxiliary heater G by opening and closing the contact 53 of relay F'. For example, when the circuit is open through thermostat F, the solenoid is energized to operate relay F' in a direction to open its contact 53. This transfers the heat from thermostat E to thermostat F so as to produce the relative cooling and heating effects on the thermostats tending to move their mercury columns in opposite directions and consequently retarding the closing of thermostat E, but accelerating the reclosing of the thermostat F. The said opening of said thermostat F and energization of relay F' also closes the additional heater circuit through resistor J and relay contact 40 as previously described so as to effect a differential in the heating and cooling of the two thermostats.

*Cooling*

If the heat valve 10 is moved to its closed position and the temperature of the space remains above the functional setting of thermostat E, the control functions of this thermostat are transferred from the heating means A to the cooling means B.

The cooling means B is of a construction very similar to heating means A except it functions to cool the space D by delivering cool air thereto or by withdrawing heat therefrom in the manner previously described. The said cooling means, therefore, includes a valve 60, a reversible motor L and a speed reduction drive 61 between the armature 62 of the motor and valve 60. The motor L includes a field winding 63 for operating the cooling means valve 60 in a direction to increase the cooling of the space D. A field winding 64 energizes the motor L for imparting a closing movement to the valve 60. When the valve 10 is fully closed, the limit switch 27, as previously indicated, is moved by the final movement of the motor to connect wire 26 with wire 55. Under such condition the field winding 63 of motor L is connected through the closing limit switch 27 of motor K, wire 55 and limit switch 56 of motor L so that the opening of cooling means valve 60 will open in sequence following the closing of the heat valve 10, and thereby permit the temperature altering means to move directly from the heating to the cooling function and to return from the cooling to the heating function by reverse sequence of operation. That is to say, when the cooling valve 60 has been opened in response to a demand for cooling, it will remain open, notwithstanding a fall in temperature within the space D, until the heat valve 10 is moved to its full open position. In such event, the limit switch 34 assumes a position to connect wire 33 with wire 57 while the limit switch 58, because of the open position of the cooling valve 60, connects wire 57 with the closing field 64. Consequently, any further call for heat results in closing the contact 32 of relay F' and thereby closes an energizing circuit through field winding 64 of motor L for imparting closing movement of the cooling means valve 60. This energizing circuit leads from positive line through wire 31, closed contact 32 of relay F', wire 33 through the limit switch 34 of motor K, wire 57, limit switch 58, field 64, armature 62 and wire 59 to the negative line.

The above sequence of operation together with the setting of the thermostats to function at the same temperature to open and close the valves 10 and 60 makes the present invention particularly suitable for maintaining a substantially constant temperature in a vehicle moving through zones of different temperatures where it is desirable to shift from the heating to the cooling functions while the vehicle, train or airplane, equipped with the improved control, is in transit.

The controls are equally suitable where seasonal heating and cooling functions are required.

Additional heat

If the heating means A should be insufficient to maintain the space D at the desired temperature, the heating control may be transferred to an additional heater C. The heater C is shown diagrammatically herein as a gasoline space heater such as is used in airplanes. It is used in the present invention to supplement the main heating system when the heater A, either because of extreme temperatures or reduction in the heat supply, makes it necessary to utilize an additional source of heat. The said heater is connected through the opening limit switch 34 of the motor K and the limit switch 58 of motor L so that the operation of heater C will follow in sequence with the movement of heat valve 10 to its fully opened position. The operating circuit includes a wire 70 leading from one contact of limit switch 58 to the burner C and thence through wire 71 to the negative line 21.

Summary of operation

Assuming that the temperature of the enclosed space is at or near the temperature desired, the thermostat circuit through thermostat E will be open at the contact 18, and the thermostat circuit through thermostat F will be closed at contact 29. If the temperature of the space being controlled increases, the thermostat E will close its circuit at contact 18 and thereby deenergize solenoid 19 to release the relay E' and thereby close an energizing circuit through the motor K to impart a closing movement to the heat valve 10. Simultaneously with the energization of the motor K, the circuit through the auxiliary heater G is deenergized and the current is transferred to auxiliary heater H of thermostat F. Consequently, the thermostat E will cool slightly, but the thermostat F will receive more heat. The mercury columns of both thermostats will, therefore, move in opposite directions. This movement, however, will be only temporary, since the heating current will be returned to the auxiliary heater G of thermostat E as soon as the mercury column of the thermostat moves below the contact 18. While the thermostat E is cooling or making an effort to move to its position below contact 18, the mercury column of thermostat F is being forced upwardly to a higher position above the contact 29. There will, therefore, be a lag in the cooling of thermostat F relative to the thermostat E, since the heating current will be again returned to the thermostat E and the thermostat F will be proportionately cooled as soon as the mercury column of the thermostat E moves below the contact 18. This cycling action will continue until the mercury column of thermostat F breaks the contact 29 before the mercury column of thermostat E engages its contact 18. The opening of the circuit at said contact 29 functions to bring about the energization of the motor K to impart opening movements to the heat valve 10. The thermostat F will cycle in the same general manner as above described in connection with thermostat E until the desired temperature is reestablished in the space D. When the thermostat F breaks its contact 29, the relay F" is energized so as to open contact 53 and thereby interrupt the supply of heating current to auxiliary heater G of thermostat E whereby this thermostat is cooled so as to move its mercury column further away from the contact 18 and thereby prevent closing of said contact while the thermostat F is in control. The closing of the thermostat F at its contact 29 is accelerated by the transfer of the heat from auxiliary heater G to the auxiliary heater H and by the further addition of heat delivered through the resistor J and the closed contact 40 of the relay F".

From the above, it will be seen that as soon as one of the thermostats functions to energize the motor K, mercury columns of both thermostats are moved in opposite directions from the upper contacts of the thermostats. However, this movement is quickly removed by the action of the thermostat having control. The heat valve will be, therefore, moved by a step by step movement from one extreme position to another. This movement, however, may be interrupted and reversed at any location. However, when the valve reaches either extreme position, the control functions of the thermostats E and F will be transferred to either the cooling means B or the additional heating means C, depending upon which extreme is reached by the valve 10. For example, if the valve moves to its fully closed position and the temperature of the space D remains too high for comfort, the control functions of thermostat E will be transferred from the means A to the motor L so as to impart an opening movement to the cooling valve 60. The cooling valve 60 will thereafter be modulated to any position necessary to establish the desired temperature within the space D. Upon the closing of the cooling valve 60, the control functions of the thermostats E and F will again be returned to the control of the operations of motor K and heat valve 10.

Assuming that the heat valve is moved to its fully open position and that the heat delivered is insufficient to maintain the space D at the desired temperature, the control functions of thermostats E and F are transferred to the operation of the gasoline space heater C or to such other additional heating means as may be desirable to supply required heat when the source of heat supply for the main heater A is ineffective or insufficient, such for example as during layovers of railway cars or when airplanes are not aloft.

We claim:

1. In combination with apparatus for altering the temperature of an enclosed space, control means for the apparatus including a thermostat responsive to temperature changes in the space for controlling the functioning of the apparatus to resist temperature increases above a predetermined point, a second thermostat responsive to temperature changes in the space for controlling the functioning of the apparatus to resist temperature decreases below a predetermined point, means for applying auxiliary heat to each of said thermostats, and means for alternately varying the volume of auxiliary heat applied to the said thermostats so that the temperature decreases at one thermostat and increases at the other.

2. In combination with apparatus for altering the temperature of an enclosed space, control means for the apparatus including a thermostat responsive to temperature changes in the space for controlling the functioning of the apparatus to resist temperature increases above a predetermined point, and a second thermostat responsive to temperature changes in the space for controlling the functioning of the apparatus to resist temperature decreases below a predetermined point, means for applying auxiliary heat to each of said thermostats, and means for alternately shifting the application of heat from one to the other of said thermostats so that the temperature decreases at one thermostat and increases at the other.

3. In combination with apparatus for altering the temperature of an enclosed space, control means for the apparatus including a thermostat responsive to temperature changes in the space for controlling the functioning of the apparatus to resist temperature increases above a predetermined point, a thermostat responsive to temperature changes in the space for controlling the functioning of the apparatus to resist temperature decreases below a predetermined point, electrically energized heaters for applying auxiliary heat to the thermostats, and means for alternately varying the volume of current to said heaters, whereby the temperature decreases at one thermostat and increases at the other.

4. In combination with apparatus for altering the temperature of an enclosed space, control means for the apparatus including a thermostat responsive to temperature changes in the space for controlling the functioning of the apparatus to resist temperature increases above a predetermined point, a thermostat responsive to temperature changes in the space for controlling the functioning of the apparatus to resist temperature decreases below a predetermined point, electrically energized heaters for applying auxiliary heat to the thermostats, and means for alternately shifting a volume of heating current from one thermostat to the other, whereby the temperature decreases at one thermostat and increases at the other.

5. In combination with electrically energized apparatus for altering the temperature of an enclosed space, control means for the apparatus including a thermostat responsive to temperature changes in the space for controlling the energization of the apparatus to resist temperature increases above a predetermined point, a thermostat responsive to temperature changes in the space for controlling the energization of the apparatus to resist temperature decreases below a predetermined point, electrically energized heaters for applying auxiliary heat to the thermostats, and means for alternately shifting a volume of heating current from one thermostat to the other, whereby the temperature decreases at one thermostat and increases at the other.

6. In combination with an electrically energized apparatus for altering the temperature of an enclosed space, temperature sensitive means for controlling said apparatus including a thermostat in the space adapted upon the rise of the temperature at the thermostat to a predetermined point to close a control circuit for activating said apparatus to resist further rise of temperature within said space, a thermostat in the space adapted upon the decrease of the temperature at this thermostat to a predetermined point to open a control circuit for activating the said apparatus to resist further decreases in the temperature within the space, electrically energized auxiliary heaters for said thermostats, and means for alternately shifting a volume of the heating current from one auxiliary heater to the other, whereby the temperature decreases at one thermostat and increases at the other to temporarily delay further functioning of both thermostats.

7. In combination with an electrically energized apparatus for altering the temperature of an enclosed space, temperature sensitive means for controlling said apparatus including a thermostat in the space adapted upon the rise of the temperature at the thermostat to a predetermined point to close a control circuit for activating said apparatus to resist further rise of temperature within said space, a thermostat in the space adapted upon the decrease of the temperature at this thermostat to a predetermined point to open a control circuit for activating the said apparatus to resist further decreases in the temperature within the space, electrically energized auxiliary heaters for said thermostats, and means for alternately shifting a volume of the heating current from one auxiliary heater to the other, whereby the temperature of the first mentioned thermostat decreases simultaneously with increases of auxiliary heat on the second mentioned thermostat and the temperature of the second mentioned thermostat decreases simultaneously with the increase of auxiliary heat on the first mentioned thermostat.

8. In combination with apparatus for altering the temperature of an enclosed space including means for delivering heat into said space and electrically energized means operable in different directions to decrease and increase the supply of heat, a mercury column thermostat having spaced contacts adapted to be closed at a predetermined temperature by the mercury column to activate the heat delivery means to reduce the delivery of heat, a like thermostat having contacts normally closed by its mercury column and adapted to be opened at a predetermined temperature to activate the heat delivery means to increase the delivery of heat, separate electric auxiliary heaters for said thermostats, electrical connections for delivering proportionate amounts of heating current to said auxiliary heaters, and means effective upon the closing of the contacts of the first thermostat to transfer heating current from its auxiliary heater to the auxiliary heater of the second thermostat so as to accelerate downward movement of the mercury column away from its contact closing position and to accelerate upward movement of the mercury column of the second thermostat above its contact closing position.

9. In combination with apparatus for altering the temperature of an enclosed space including means for delivering heat into said space and electrically energized means operable in different directions to decrease and increase the supply of heat, a mercury column thermostat having spaced contacts adapted to be closed at a predetermined temperature by the mercury column to activate the heat delivery means to reduce the delivery of heat, a like thermostat having contacts normally closed by its mercury column and adapted to be opened at a predetermined temperature to activate the heat delivery means to increase the delivery of heat, separate electric auxiliary heaters for said thermostats, electrical connections for delivering proportionate amounts of heating current to said auxiliary heaters, means effective upon the closing of the contacts of the first thermostat to transfer heating current from its auxiliary heater to the auxiliary heater of the second thermostat so as to accelerate downward movement of the mercury column away from its contact closing position and to accelerate upward movement of the mercury column of the second thermostat above its contact closing position and means effective upon the opening of the contacts of the second thermostat for transferring heating current from the first to the second thermostat and for applying additional current to its auxiliary heater to accelerate its return to its closed position.

10. In combination with apparatus for altering the temperature of an enclosed space including a means for delivering heat into the space, electrically operated means for increasing and decreasing the delivery of heat, a means for cooling the space and an electrically energizing means for decreasing and increasing the effectiveness of the cooling means; a temperature sensitive device responsive to temperature changes within the space for controlling the operation of said electrically operated means during its operation to decrease the delivery of heat, a thermostat for controlling the operation of said electrically operated means for increasing the delivery of heat, and means actuated by the operation of the said electrically operated means for transferring the control functions of said thermostats to the said electrically energized means, whereby decreases and increases in the effectiveness of the space cooling means are controlled, respectively, by the first and second mentioned thermostats.

11. In combination with apparatus for altering the temperature of an enclosed space including a means for delivering heat into the space, electrically operated means for increasing and decreasing the delivery of heat, a means for cooling the space and an electrically energizing means for decreasing and increasing the effectiveness of the cooling means; a temperature sensitive device responsive to temperature changes within the space for controlling the operation of said electrically operated means during its operation to decrease the delivery of heat, a thermostat for controlling the operation of said electrically operated means for increasing the delivery of heat, means actuated by the operation of the said electrically operated means for transferring the control functions of said thermostats to the said electrically energized means, whereby decreases and increases in the effectiveness of the space cooling means are controlled, respectively, by the first and second mentioned thermostats, an electric auxiliary heater for each of said thermostats, and means actuated by the functioning of one thermostat to transfer auxiliary heater current from one thermostat to the other.

12. In combination with apparatus for altering the temperature of an enclosed space including a means for delivering heat into the space, electrically operated means for increasing and decreasing the delivery of heat, a means for cooling the space and an electrically energizing means for decreasing and increasing the effectiveness of the cooling means; a temperature sensitive device responsive to temperature changes within the space for controlling the operation of said electrically operated means during its operation to decrease the delivery of heat, a thermostat for controlling the operation of said electrically operated means for increasing the delivery of heat, means actuated by the operation of the said electrically operated means for transferring the control functions of said thermostats to the said electrically energized means, whereby decreases and increases in the effectiveness of the space cooling means are controlled, respectively, by the first and second mentioned thermostats, an electric auxiliary heater for each of said thermostats, and means actuated by the functioning of one thermostat to increase the supply of current to one auxiliary heater and to decrease the supply of current to the other.

13. In combination with apparatus for altering the temperature of an enclosed space including a primary heater for delivering heat into the enclosed space, electrically operated means for increasing and decreasing the delivery of heat and a second heater for adding heat to the enclosed space; a temperature sensitive device responsive to temperature changes within the space for controlling the operation of said electrically operated means during its operation to decrease the delivery of heat, a thermostat for controlling the operation of said electrical means for increasing the delivery of heat, and means actuated by the movement of said electrically operated means to its extreme heat delivery position for transferring the control functions of said thermostats to the second heating means whereby the primary and second heaters are operated in sequence, an electric auxiliary heater for each of said thermostats, and means actuated by the functioning of one thermostat to increase the supply of current to one auxiliary heater and to decrease the supply of current to the other auxiliary heater.

14. In combination with apparatus for altering the temperature of an enclosed space including a primary heater for delivering heat into the space, a secondary heater for heating said space, and a means for cooling the space, electrically operated means for increasing and decreasing the delivery of heat from said primary heater, an electrically energized means for decreasing and increasing the effectiveness of said cooling means; a temperature sensitive device for controlling the operation of the said electrically operated means during its operation to decrease the delivery of heat, a thermostat for controlling the operation of said electrically operated means for increasing the delivery of heat, means actuated by the operation of the said electrically operated means for transferring the control functions of said thermostats to the secondary heater, whereby the primary and the secondary heaters operate in sequence, means operated by movement of the first mentioned electrically operated means to its other limit position for transferring the control functions of said thermostats to the said electrically energized means to control the operation of the cooling means in sequence with the first mentioned heater.

15. In combination with apparatus for altering the temperature of an enclosed space including means for delivering heated air into the space and cooling means for delivering cool air into the space, separate reversible motors for increasing and decreasing the supply of heated air and for increasing and decreasing the supply of cool air, a thermostat and a relay actuated thereby for controlling the heated air delivery means during its operation to decrease the delivery of air, a thermostat and a relay actuated thereby for controlling the heated air delivery means during its operation to increase the delivery of air, means actuated by the movement of the heated air delivery means to one extreme position for transferring the thermostat connections to the motor for increasing and decreasing the supply of cool air, auxiliary heaters for each thermostat and electric connections through their respective relays for increasing the supply of heat to one auxiliary heater and decreasing the supply of current to the other.

16. In combination with apparatus for altering the temperature of an enclosed space including means for delivering heated air into the space and cooling means for delivering cool air into the space, separate reversible motors for increasing and decreasing the supply of heated air and for increasing and decreasing the supply of cool air, a thermostat and a relay actuated thereby for controlling the heated air delivery means during its operation to decrease the delivery of air, a thermostat and a relay actuated thereby for controlling the heated air delivery means during its operation to increase the delivery of air, means actuated by the movement of the heated air delivery means to one extreme position for transferring the thermostat connections to the motor for increasing and decreasing the supply of cool air, auxiliary heaters for each thermostat and electric connections through their respective relays for transferring electric current from one auxiliary heater to the other, whereby one thermostat is cooled simultaneously with the application of more auxiliary heat to the other.

TIMOTHY J. LEHANE.
EVERETT H. BURGESS.

REFERENCES CITED

The following references are of record in the file of this patent:

UNITED STATES PATENTS

| Number | Name | Date |
| --- | --- | --- |
| 2,108,507 | Parks et al. | Feb. 15, 1938 |
| 2,208,761 | Hartig | July 23, 1940 |
| 2,284,764 | Parks | June 2, 1942 |
| 2,328,472 | Lehane et al. | Aug. 31, 1943 |
| 2,382,073 | Lehane et al. | Aug. 14, 1945 |